Nov. 9, 1971     S. A. OSTRAGER     3,618,222
DUAL SPIRIT LEVEL UNITS WITH SIMULTANEOUS VISION
Original Filed Sept. 27, 1967
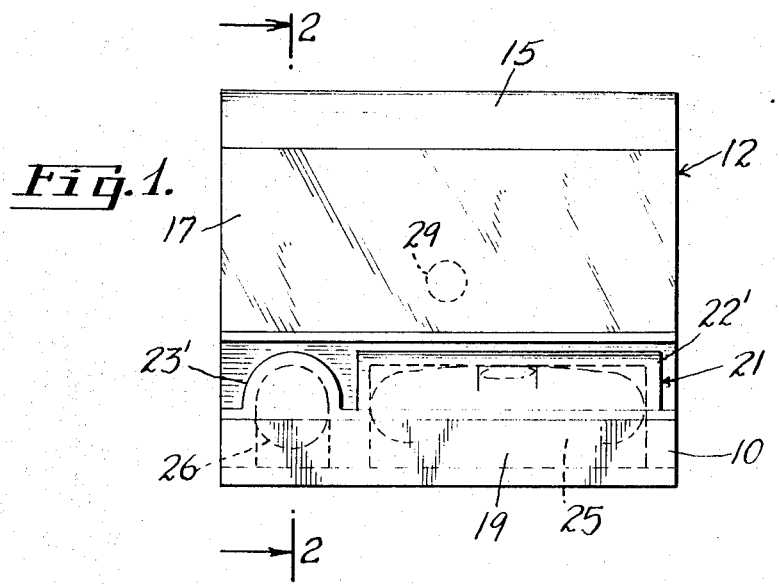
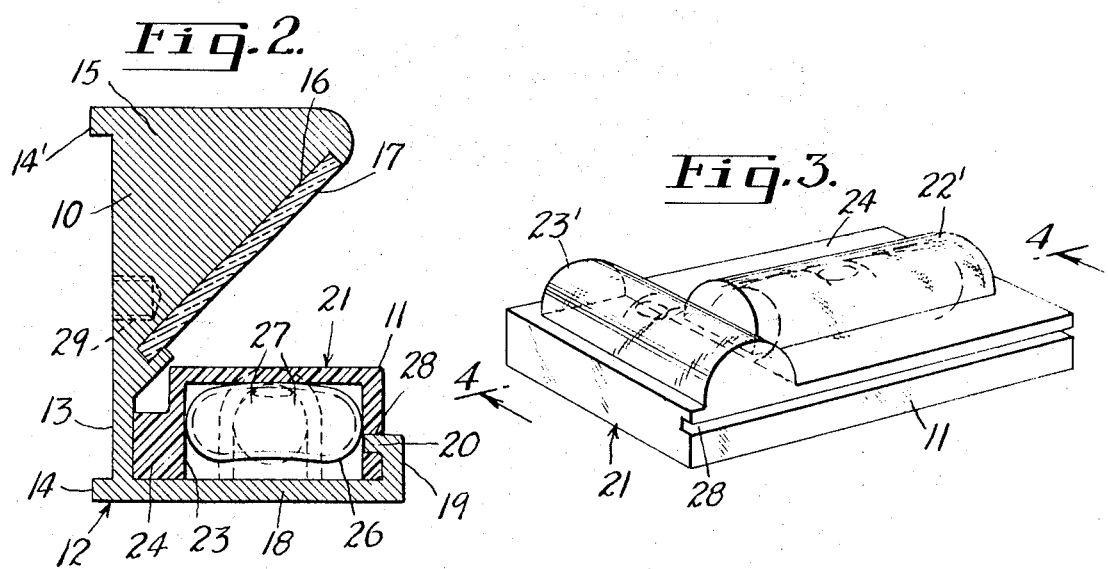
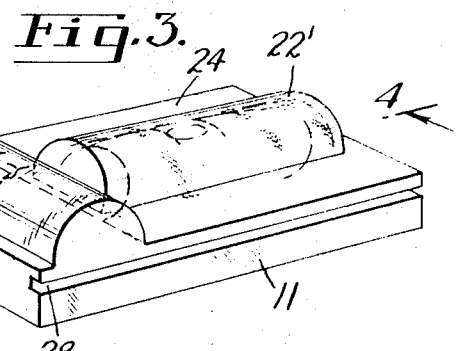
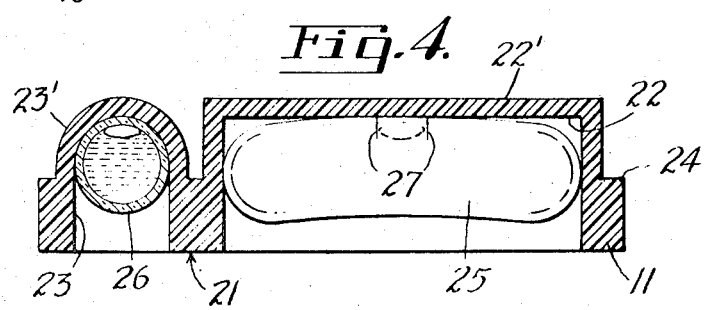
INVENTOR.
SEYMOUR A. OSTRAGER
BY Howard C. Thompson
ATTORNEY United States Patent Office 3,618,222
Patented Nov. 9, 1971

3,618,222
DUAL SPIRIT LEVEL UNITS WITH SIMULTANEOUS VISION
Seymour A. Ostrager, Bronx, N.Y., assignor to Miracle Instrument Co., New York, N.Y.
Continuation of application Ser. No. 670,943, Sept. 27, 1967. This application Dec. 10, 1969, Ser. No. 880,493
Int. Cl. G01c 9/24
U.S. Cl. 33—211
2 Claims

ABSTRACT OF THE DISCLOSURE

A spirit level unit in the form of an assemblage, comprising a body part supporting a spirit casing, having two spirits arranged at right angles to each other and the body part supporting a mirror for simultaneous reading of both spirits of said casing.

---

This is a continuation of application Ser. No. 670,943, filed Sept. 27, 1967 and now abandoned.

BACKGROUND OF THE INVENTION (1) The invention deals with what might be termed a miniature level device, constituting an article of manufacture and consisting of an assemblage of a body part and a spirit casing, the spirit casing, in itself, constituting an article of manufacture, as well as the body part, the latter being so constructed as to be formed as an extruded product to simplify and economize on the cost of production and the casing of the spirit part comprising a molded translucent plastic casing.

(2) To the best of applicant's knowledge and belief, a level device of the character defined is new and applicant knows of no prior patent dealing with a structure of the kind defined.

SUMMARY OF THE INVENTION

By constructing a spirit level device along the lines briefly noted above, the body part of the assemblage can be formed economically and in a manner to gauge both levels and plumbs of horizontal and vertical surfaces and is made sufficiently small to fit within the hand, to be carried in the pocket or in a carrying case or container of any type and kind to be available for use at any time.

The novel features of the invention will be best understood from the following description, when taken together with the accompanying drawing, in which certain embodiments of the invention are disclosed and, in which, the separate parts are designated by suitable reference characters in each of the views and, in which:

FIG. 1 is a front view of a level made according to my invention.

FIG. 2 is a section on the line 2—2 of FIG. 1.

FIG. 3 is a perspective view of the spirit part of the device detached; and

FIG. 4 is a section on the line 4—4 of FIG. 3.

In illustrating one adaptation and use of my invention, the spirit level comprises an assemblage of a body part 10, which may be said to comprise the gauge frame of the assemblage and a spirit vial part 11 fixed in the body part in producing the complete assemblage and producing what might be termed the spirit level unit 12, as seen in FIGS. 1 and 2. At this time, it is pointed out that this unit is made of such size as to fit within the hand and sufficiently small to be carried in the pocket of a garment, or in a carrying case of any type or kind to be available for use as and when required.

Considering FIGS. 1 and 2 of the drawing, the body part 10 comprises what may be termed a back wall 13 having, at ends thereof, projecting flanges 14, 14'. From the standpoint of reading the units, the top of the wall 13 has a forward projecting triangular extension 15, with a socket 16 at an angle of 45° to the wall 13 for support of a mirror 17, as clearly seen in FIG. 2.

The bottom of the body 10 has a wall 18 in alinement with the flange 14 and at right angles to the wall 13. The forward end of 18 has a short raised wall 19 having an inwardly directed flange 20. The wall 19 is at right angles to the wall 18 and the flange 20 is at right angles to the wall 19. This construction forms on the body 10, between and for the full length of the walls 13, 18 and 19, a channel for supporting the part 11, which may be said to be a spirit vial assemblage 21, shown detached in FIGS. 3 and 4 on a large scale.

The assemblage 21 comprises a casing of molded transparent plastic material fashioned to form long and short chambers 22 and 23, having semi-circular tops or closures 22' and 23' arranged at right angles to each other. The tops 22' and 23' project above the top of a rectangular base 24 of the casing. The rectangular base 24 defines parallel long sides and parallel short ends. The chamber 22 and closure 22' are parallel to the base sides and at right angles to the base ends; whereas, the chamber 23 and closure 23' are parallel to the base ends and at right angles to the base sides. The chambers 22 and 23, in the construction shown, open through the base, as seen in FIG. 4. In some instances, the chambers in the base could be otherwise formed and this would also be true of the semi-circular tops or closures 22', 23', the only essential feature in the spirit vial part being that the vials are arranged at right angles to each other, that the lower surface of the base is flat and that the closures 22', 23' are transparent to facilitate reading of the vials.

Mounted in said chambers are long and short spirits vials 25, 26, having curved upper surfaces, note FIGS. 2 and 4, on which are the usual markings 27 for proper readings of the vials. The vials 25 and 26, when properly adjusted in the casing, are cemented in the chambers 22 and 23. The bottom and edges of the casing can be used to judge the setting of the vials in the manufacture of this assemblage.

Considering FIGS. 2 and 3, one side edge of the base 24 of the casing has a longitudinal groove 28 to receive the flange 20 in coupling the part 11 or spirit vial assemblage with the body 10. In this mounting, the base 24 of the casing can be cemented to the body part 10 or in some instances, a drive fit can be used.

The body 10 can have a threaded hole, indicated in dotted lines at 29 in FIG. 2 of the drawing, for mounting the unit in connection with a support. In this instance, the unit could form the part of a complete spirit level assemblage of a larger magnitude.

The body part 10 of the assemblage will constitute an article of manufacture, as is also the spirit vial assemblage, including the casing, with the vials mounted therein and the two parts can be assembled in producing the end product, which may be said to comprise a miniature spirit level device, keeping in mind that the part 11 can be used as a spirit level, without the benefits of utilizing the body part 10, the latter providing a protective support for the part 11, as well as the means for providing simultaneous reading of the angularly disposed vials of the part 11 by viewing the vials through the mirror 17.

I claim:

1. A self-contained dual spirit level unit comprising a body part and a spirit vial part, the body part having back and bottom walls disposed at right angles to each other, the back wall having a triangular extension arranged over and spaced from said bottom wall, one surface of said extension facing said bottom wall being at an acute angle to the bottom wall, a mirror supported on said one surface, the forward portion of the bottom wall having a short raised wall forming, in combination with said back and bottom walls, an upwardly directed channel, said spirit vial part having a rectangular base fitting snugly in said channel, and said vial part including means projecting at the upper surface of said base for visibly supporting and posiitoning two spirit vials in a common plane parallel to said bottom wall in close proximity to and at right angles to each other, and said body part including means at the rear of said back wall, comprising rearwardly extending flanges along opposed edges of said back wall and a central threaded recess, for mounting the unit in connection with a support.

2. A unit as defined in claim 1 wherein said raised wall includes an inwardly directed flange, said flange engaging an elongated groove on one side of the base of said vial part.

References Cited
UNITED STATES PATENTS

| | | | |
|---|---|---|---|
| 625,019 | 5/1899 | Cardwell | 33—207 |
| 703,306 | 6/1902 | Roe | 33—211 |
| 2,727,314 | 12/1955 | Dossie | 33—211 |
| 2,750,677 | 6/1956 | Wirth | 33—211 |
| 3,422,544 | 1/1969 | Wyse | 33—207 |

LEONARD FORMAN, Primary Examiner

D. A. DEARING, Assistant Examiner